US008418076B2

(12) United States Patent
Mail et al.

(10) Patent No.: US 8,418,076 B2
(45) Date of Patent: Apr. 9, 2013

(54) MANAGING INPUTS FROM A PLURALITY OF USER INPUT DEVICE ACTUATORS

(75) Inventors: Scott M. Mail, Seattle, WA (US); Dan Odell, Kirkland, WA (US); Tejas Mistry, Sammamish, WA (US); Vadim Dmitriev, Duvall, WA (US); Nino Aldrin Lasco Sarmiento, Monroe, WA (US); Pavan Davuluri, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 12/120,928

(22) Filed: May 15, 2008

(65) Prior Publication Data

US 2009/0288039 A1     Nov. 19, 2009

(51) Int. Cl.
*G06F 3/048* (2006.01)
(52) U.S. Cl.
USPC ............ 715/767; 715/802; 715/803; 715/804
(58) Field of Classification Search .................. 715/766, 715/802–804, 815, 783, 764, 767
See application file for complete search history.

(56) References Cited

U.S. PATENT DOCUMENTS

| 4,890,098 | A | | 12/1989 | Dawes et al. | |
|---|---|---|---|---|---|
| 5,572,649 | A | | 11/1996 | Elliott et al. | |
| 5,586,243 | A | * | 12/1996 | Barber et al. | 715/856 |
| 5,712,995 | A | | 1/1998 | Cohn | |
| 5,734,380 | A | | 3/1998 | Adams et al. | |
| 5,974,384 | A | * | 10/1999 | Yasuda | 704/275 |
| 6,002,862 | A | * | 12/1999 | Takaike | 703/17 |
| 6,462,757 | B1 | * | 10/2002 | Kao et al. | 715/783 |
| 6,633,313 | B1 | * | 10/2003 | Cirne et al. | 715/744 |
| 6,654,038 | B1 | * | 11/2003 | Gajewska et al. | 715/802 |
| 6,762,776 | B2 | * | 7/2004 | Huapaya | 715/802 |
| 6,874,128 | B1 | | 3/2005 | Moore et al. | |
| 6,909,443 | B1 | | 6/2005 | Robertson et al. | |
| 7,075,513 | B2 | * | 7/2006 | Silfverberg et al. | 345/157 |
| 7,114,129 | B2 | * | 9/2006 | Awada et al. | 715/786 |
| 2002/0191028 | A1 | | 12/2002 | Senechalle et al. | |
| 2003/0107603 | A1 | * | 6/2003 | Clapper | 345/784 |
| 2004/0255254 | A1 | * | 12/2004 | Weingart et al. | 715/804 |

(Continued)

OTHER PUBLICATIONS

Kandogan, et al., "Elastic Windows: Improved Spatial Layout and Rapid Multiple Window Operations", Proceedings of the workshop on Advanced Visual Interfaces, ACM, 1996, pp. 29-38.

(Continued)

*Primary Examiner* — Tadeese Hailu
(74) *Attorney, Agent, or Firm* — Alleman Hall McCoy Russell & Tuttle LLP

(57) ABSTRACT

A computing device and method for managing inputs from a plurality of user input device actuators are provided. The computing device may include code stored in memory for implementing, via a processor, an actuator input module configured to receive a first actuator input from a first user input device actuator, and a second actuator input from a second user input device actuator. The computing device may further execute code to implement a window selection module configured to select a first selected window to which the first actuator input is sent according to predetermined selection rules, to select a second selected window to which the second actuator input is sent according to the predetermined selection rules, and to send the first actuator input to the first selected window and to send the second actuator input to the second selected window.

18 Claims, 4 Drawing Sheets

U.S. PATENT DOCUMENTS

| | | | |
|---|---|---|---|
| 2005/0097466 A1* | 5/2005 | Levi Montalcini | 715/700 |
| 2005/0179655 A1* | 8/2005 | Ludwig | 345/157 |
| 2005/0198585 A1* | 9/2005 | Haynes | 715/781 |
| 2005/0240873 A1 | 10/2005 | Czerwinski et al. | |
| 2005/0289478 A1 | 12/2005 | Landman et al. | |
| 2006/0161860 A1 | 7/2006 | Holecek et al. | |
| 2007/0136677 A1* | 6/2007 | Agarwal | 715/767 |
| 2008/0122808 A1* | 5/2008 | Huang | 345/184 |

OTHER PUBLICATIONS

Tan, et al., "WinCuts: Manipulating Arbitrary Window Regions for More Effective use of Screen", In CHI '04 extended abstracts on Human Factors in Computing Systems, ACM, 2004, pp. 4.

* cited by examiner

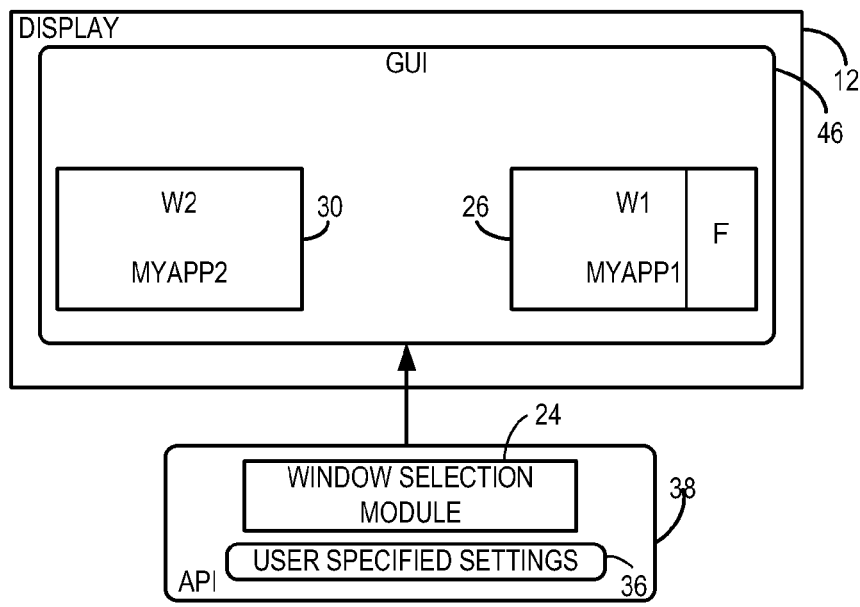
FIG. 5
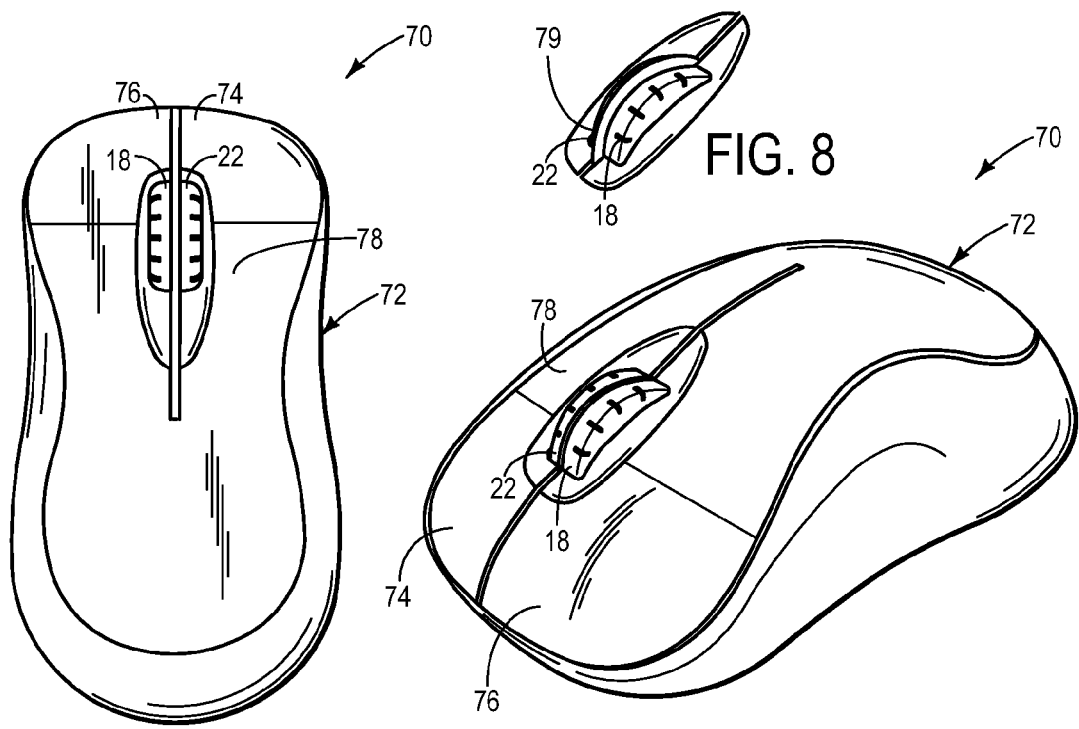
FIG. 6
FIG. 8
FIG. 7

MANAGING INPUTS FROM A PLURALITY OF USER INPUT DEVICE ACTUATORS

BACKGROUND

With larger monitors and more powerful processors becoming available in recent computing devices, computer users increasingly engage in concurrent use of multiple application programs. Further, each application program may include multiple windows to which user input may be directed. It is therefore a challenge for the user to switch between these multiple windows and efficiently enter user input to the appropriate application window. Before manipulating a scroll wheel of a mouse, for example, it can be laborious for a user with many windows open to bring a desired window into focus to receive a first scroll input, and then bring another desired window into focus to receive a second scroll input. This can result in wasted time and frustration for the user.

SUMMARY

A computing device and method for managing inputs from a plurality of user input device actuators are provided. The computing device may include code stored in memory for implementing, via a processor, an actuator input module configured to receive a first actuator input from a first user input device actuator, and a second actuator input from a second user input device actuator. The computing device may further execute code to implement a window selection module configured to select a first selected window to which the first actuator input is sent according to predetermined selection rules, to select a second selected window to which the second actuator input is sent according to the predetermined selection rules, and to send the first actuator input to the first selected window and to send the second actuator input to the second selected window.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 illustrates an implementation of a selection rule based on a user specified setting, by the window selection module of the device of FIG. 1.

FIG. 6 illustrates a top view of an exemplary user input device in the form of a mouse, featuring user input device actuators in the form of dual scroll wheels.

FIG. 7 illustrates a perspective view of the exemplary user input device of FIG. 6.

FIG. 8 illustrates a detail perspective view of another embodiment of the mouse of FIG. 6, featuring a divider separating the actuators.

DETAILED DESCRIPTION

Figure 1:
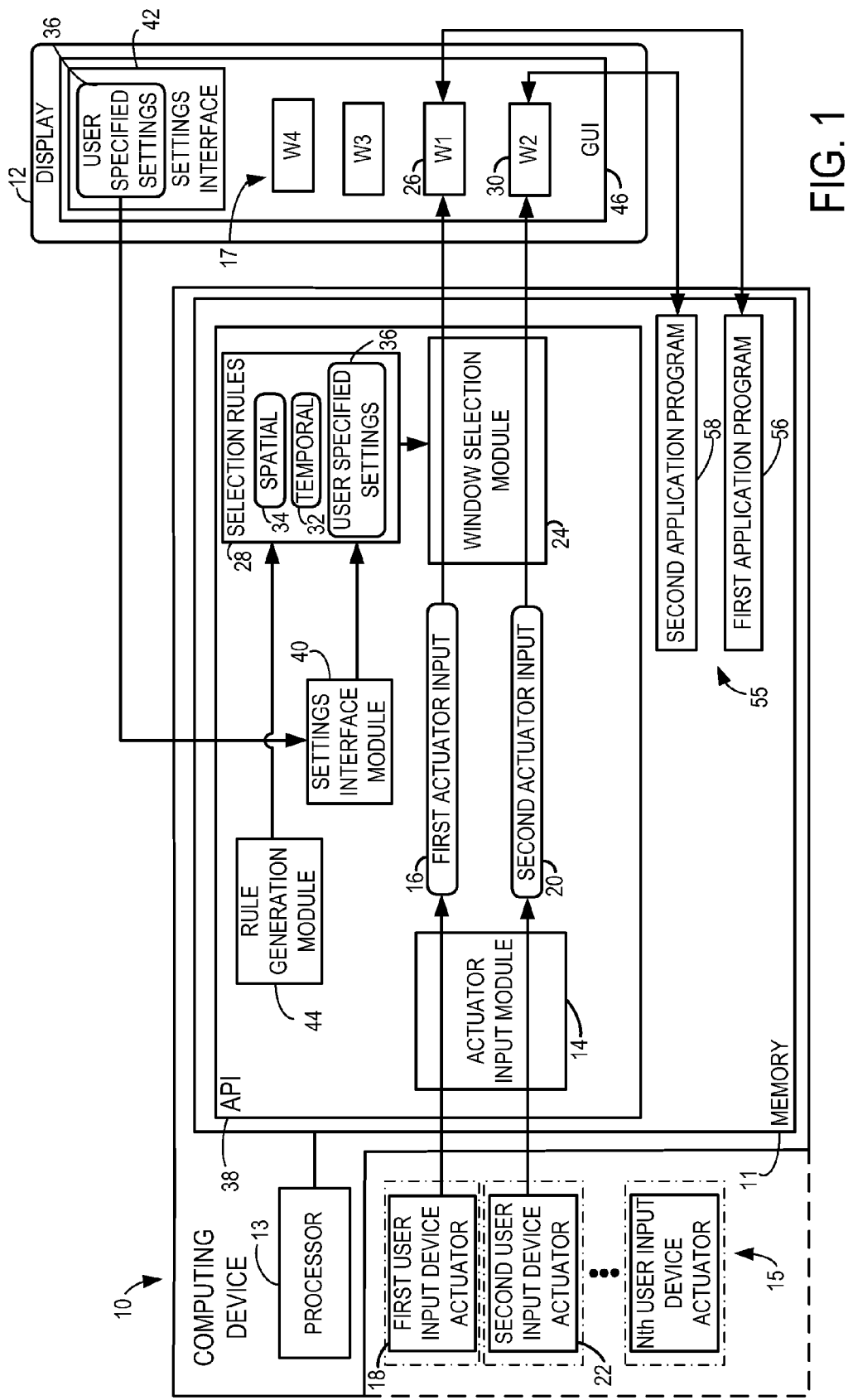
FIG. 1 illustrates a schematic representation of one embodiment of a computing device for managing inputs from a plurality of user input device actuators.

FIG. 1 illustrates an embodiment of a computing device 10 for managing inputs from a plurality of user input device actuators. Computing device 10 may include code stored in memory 11 for implementing routines to achieve the functionality described herein via a processor 13. Computing device 10 may, for example, be a personal computer, laptop computer, smart phone, portable data assistant, personal media player, or other suitable computing device.

Computing device 10 may be configured to associate user inputs from a plurality of user input device actuators 15 with one or more windows selected from a plurality of windows 17 displayed in a graphical user interface 46 on a display 12. To achieve this functionality, computing device 10 may include an actuator input module 14 configured to receive a first actuator input 16 from a first user input device actuator 18, and a second actuator input 20 from a second user input device actuator 22. The first user input device actuator 18 and the second user input device actuator 22 may be, for example, scroll wheels, touch sensors, or other user input device actuators configured to receive haptic input from a user. The haptic input may be processed by the actuator input module 14, for example, to be in the form of a scrolling input, which in turn may be sent to a window of an application program for interpretation. The actuator input module 14 may be configured to receive and process the first actuator input 16 and the second actuator input 20 inputs substantially concurrently, so that the first user input device actuator 18 and the second user input device actuator 22 may be concurrently used by a user. While the first and second user input device actuators are discussed herein by way of example, it will be appreciated that a larger number actuators may be provided, as illustrated in FIG. 1 by the Nth user input device actuator, and that corresponding actuator inputs may be processed in parallel.

In some examples, the first user input device actuator 18 and/or the second user input device actuator 22 may be mounted in a housing of the computing device 10, as indicated by dashed lines in FIG. 1. In other examples, the first user input device actuator 18 and/or the second user input device actuator 22 may not be mounted in a housing of computing device 10, but rather may be incorporated into the housings of one or more external user input devices, such as an external mouse, keyboard, touch pad, graphics tablet, game controller, etc.

Continuing with FIG. 1, computing device 10 may further include a window selection module 24 configured to select from among the plurality of windows 17 a first selected window 26 to which the first actuator input 16 is sent, according to predetermined selection rules 28. In addition, the window selection module 24 may select from among the plurality of windows 17, a second selected window 30 to which the second actuator input 20 is sent, according to the predetermined selection rules 28.

The predetermined selection rules 28 may include, for example, one or more temporal predetermined selection rules 32, spatial predetermined selection rules 34, and predetermined user specified settings 36, as discussed in more detail below. The temporal predetermined selection rules 32 may be, for example, based on a chronological order of the first selected window 26 and/or the second selected window 30. The spatial predetermined selection rules 32 may be based on a position of the windows 17 within the GUI 46 on display 12. The predetermined user specified settings 36 may indicate a specific application window, or frame within a window, for example, to send actuator input from a specified user input device actuator 15, as described below.

Following selection of the first and second selected windows, the window selection module 24 is configured to send the first actuator input 16 to the first selected window 26, and to send the second actuator input 20 to the second selected window 30. In this manner, the window selection module 24 applies the predetermined selection rules 28 to map inputs from the different user input device actuators 15 to appropriate windows 17, promoting efficient user interaction with the computing device 10. Since the window selection module 24 allows more than one window 17 to be selected for receiving actuator input concurrently, potentially cumbersome user input operations to change the window that is "in focus" for receiving user input may be reduced.

It will be appreciated that the actuator input module 14, the window selection module 24 and the selection rules 28 may be implemented as an application programming interface (API) 38 to facilitate communication between these modules, application programs, and an operating system of the computing device. Alternatively, either or all of these modules may be implemented via application programs, drivers, etc., on computing device 12.

The computing device 10 may further be configured to implement a settings interface module 40 as part of API 38, which is configured to generate a settings interface 42 to be displayed on display 12. The settings interface 42 may be configured to receive one or more user-specified settings 36 form a user, which may be sent to the setting interface module 40 for inclusion within selection rules 28. Via the settings interface 42, a user may specify a particular window, or frame within a window, of an application to which a specific actuator's input should be mapped, for example.

A rule generation module 44 may also be provided to programmatically generate selection rules 28, based on a variety of detected parameters such as user login, the identity of application programs in use, usage history and patterns, etc. These programmatically generated selection rules may be stored with the other selection rules 28 at a location accessible by the window selection module 24.

Display 12 may be configured to be coupled to computing device 10 and configured to display a multi-window graphical user interface (GUI) 46 generated by an operating system of the computing device 10. Within GUI 46, a plurality of windows 17 generated by one or more application programs 55 may be concurrently displayed. By way of example, in FIG. 1, GUI 46 is depicted to include a first window W1, a second window W2, a third window W3, and a fourth window W4. Among these, the first window W1 is illustrated as the first selected window 26 and the second window W2 is illustrated as the second selected window 30. Of course, it will be appreciated that other numbers of windows may be displayed, and the first selected window 26 and second selected window 30 will vary based on the predetermined selection rules 28.

It will also be appreciated that more than one window 17 may be associated with a particular application program, and in such circumstances the window selection module 24 may be configured to determine which among the various windows associated with the application program should be selected for delivery of incoming actuator input from each of the plurality of actuators 15. Further, it will be appreciated that in some examples, a window may further include a plurality of sub-windows within its bounds, also referred to as frames. Under such circumstances, the window selection module 24 may be configured to determine which sub-window to which actuator input should be sent.

Continuing with FIG. 1, window selection module 24 may be further configured to encode the first actuator input 16 and/or the second actuator input 20 to instruct the first selected window 26 and/or second selected window 30 to perform an action based on the first actuator input 16 and/or second actuator input 20. Alternatively, the actuator inputs may be passed in a raw form without encoding to the application programs via the selected windows, and appropriate actions may be determined by the application programs 55. A variety of actions may be specified either by the window selection module 24 or the application programs 55, for performance in response to receiving the actuator input, including tabbing, list item selection, scrolling, mode changing, window switching, gadget switching, zooming, window sizing, menu list access, multiple desktop switching, magnification, panning, rate change, sensitivity adjustment, and user re-assignable actions. In this way, desired actions may be carried out in different windows, initiated by separate actuator inputs of the user, without manually switching the window in focus.

Figure 2:
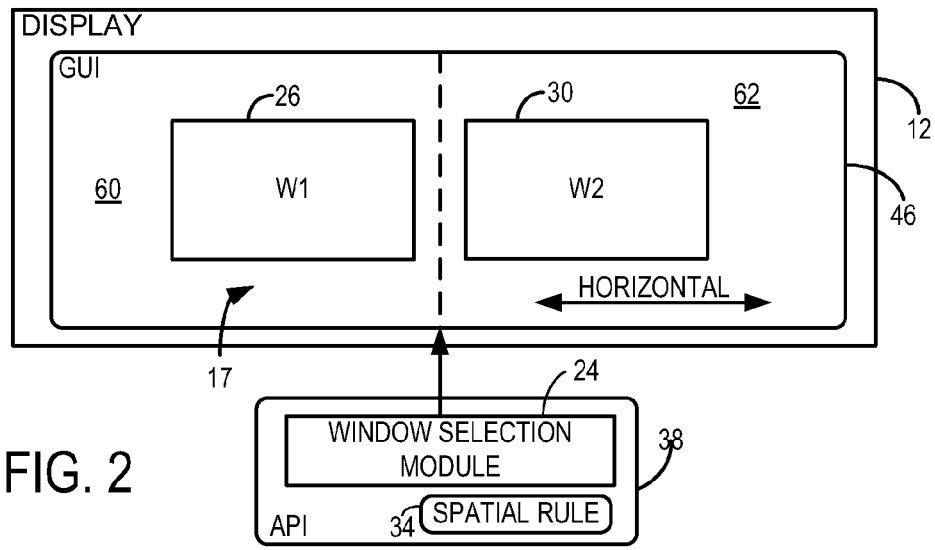
FIG. 2 illustrates an implementation of spatial selection rules based on horizontal position, by the window selection module of the device of FIG. 1.
Figure 3:
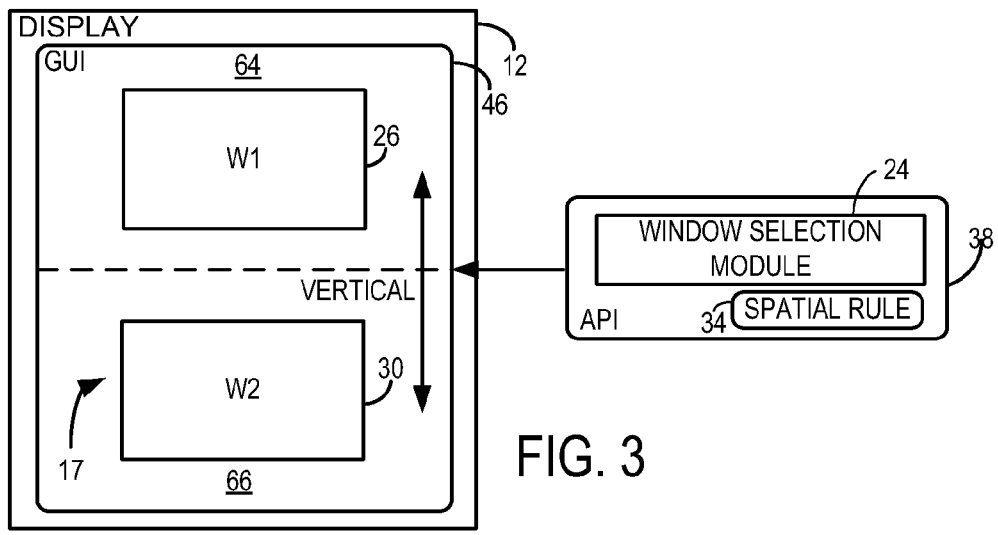
FIG. 3 illustrates an implementation of spatial selection rules based on vertical position, by the window selection module of the device of FIG. 1.

FIG. 2-FIG. 5 illustrate example implementations of the predetermined selection rules 28, to achieve particular user interaction experiences. FIG. 2 and FIG. 3 show example implementations in which the selection rules 28 include a spatial predetermined selection rule 34 that is based on detected spatial positions of the windows 17. The detected spatial positions of the windows may include a detected variation in horizontal position of the first selected window 26 and the second selected window 30, as shown in FIG. 2. Furthermore, the detected spatial position of the windows may include a variation in vertical position of the first window W1 and the second window W2, as shown in FIG. 3. To ascertain the spatial position of each window, a point of reference may be used, such as the upper left corner of each window. Further, in some cases, windows that are entirely hidden behind other windows may be excluded by selection rules 28 from selection as the target window to which actuator output is to be sent, since the user may be presumed to not be actively using these windows.

Referring specifically to FIG. 2, the spatial predetermined selection rule 34 may specify, for example, that input from a first user input device actuator 18 are to be sent to a leftmost positioned window, and the input from the second user input device actuator are to be sent to a rightmost positioned window. In the illustrated example, the horizontal variation between the first window W1 and the second window W2 may be detected by the window selection module 24, and the leftmost window identified as the first selected window 26 and the rightmost window identified as the second selected window 30. Thereafter, input from the first user input device actuator 18 may be assigned to the first selected window 26 and input from the second user input device actuator 22 may be assigned to the second selected window 30, based on the detected horizontal variation. As discussed above, the horizontal variation may be measured from a top left corner of each window, or from another suitable point of reference such as the center of each window. It will be appreciated that temporal rules or user-specified settings may be further applied in combination with the horizontal spatial predetermined selection rules to select target windows for actuator input. For example, the leftmost and rightmost most recently accessed windows may be compared for horizontal position and mapped to the first and second actuator inputs, or the left most and rightmost windows from one or more specified application programs specified by the user may be compared for horizontal position, and mapped to the first and second actuator inputs.

Continuing with FIG. 2, as an alternative to determining spatial position of the windows based on their position relative to the entire display 12, the display 12 may be divided into a plurality of spatial regions, such as a left region 60 and a right region 62, and the position of each candidate window may be checked to determine whether it is in each of the spatial regions. In this example, the horizontal spatial predetermined selection rule may be implemented as follows. First, the horizontal position of the first window W1 and/or the second window W2 is detected, using a suitable point of reference as described above. Next, it may be determined if the first window W1 and/or second window is within the left region 60 or the right region 62. Finally, window W1 may be selected as the first selected window 26 since it lies within the left region 60, and the second window W2 may be selected as the second selected window 30 since it is the located within right region 62. In this way, the first selected window 26 may be associated with the first actuator input 16 from the first user input device actuator 18, and the second selected window 30 may be associated with the second actuator input 20 from the second user input device actuator 22. It will be appreciated that, where multiple windows are present in a spatial region, additional temporal selection rules 32 or user specified settings 36 may be applied within each region to determine the first and second selected windows. For example, the most recently used window in each region may be selected, or a window of a user specified application program in each region may be selected.

FIG. 3 shows an example implementation of a vertical spatial predetermined selection rule specifying that a first actuator input 16 be mapped to a topmost window, as positioned spatially on GUI 34 of display 12, and a second actuator input 20 be mapped to a bottommost window, as positioned spatially on GUI 46 of display 12. To implement such a rule, the window selection module 24 first detects a vertical variation between the first window W1 and the second window W2, using a suitable point of reference as discussed above. Next, the first window W1 is selected as the first selected window 26 and the second window W2 is selected as the second selected window 30, based on the detected vertical variation of the windows. As described above, additional temporal selection rules 32 or user specified settings 36 may concurrently be applied with a vertical spatial predetermined selection rule.

Continuing with FIG. 3, in another example, rather than comparing the vertical positions of the windows 17 relative to the entire visible area of display 12, the vertical spatial predetermined selection rule may be implemented by dividing the display 12 into a plurality of spatial regions, such as an upper region 64 and a lower region 66, and assigning actuator inputs to a selected window in each of the upper region and lower region. To implement such a rule, the window selection module 24 detects a vertical position of one or more of the selected windows using a suitable reference point as described above. Based on the variation in detected positions, the first window W1 may be selected as the first selected window 26 and the second window may be selected as the second selected window 30, and the first actuator input 16 and second actuator input 20 may be assigned accordingly.

Figure 4:
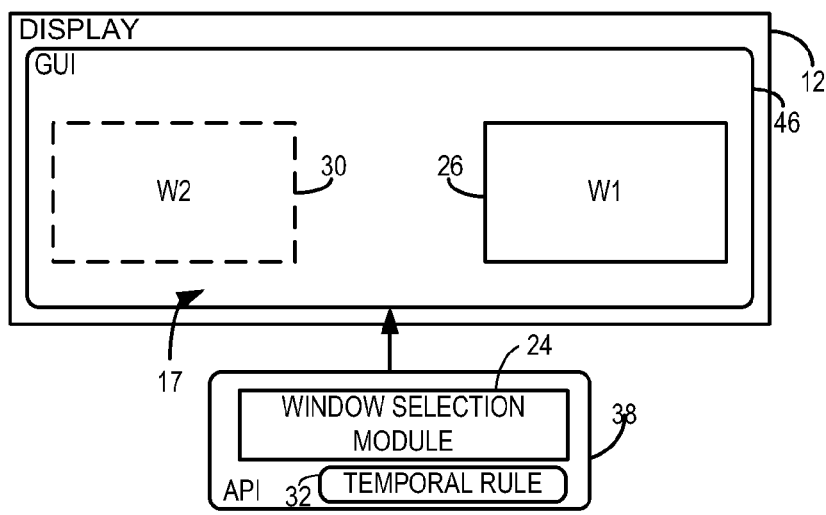
FIG. 4 illustrates an implementation of temporal selection rules by the window selection module of the device of FIG. 1.

FIG. 4 shows an exemplary implementation of a temporal predetermined selection rule 32, according to which the first selected window 26 and/or the second selected window 30 may be selected by the window selection module 24 based on a detected temporal property of each window. The temporal property may include a chronological order of use of each window within the GUI 46 on display 12. In one use case scenario applying such a rule, a user may currently be typing in a document in the first window W1, following an earlier session in which the user was typing in a document in a second window W2. As such the first window W1 presently in use may be deemed to be the first selected window 26 and the second window W2 may be deemed to be the second selected window 30. As a result, the first selected window 26 may be associated with a first actuator input 16 and the second selected window 30 may be associated with a second actuator input 20.

FIG. 5 illustrates the implementation of a predetermined selection rule 28 that is based on a user specified setting 36. The depicted example illustrates that the user specified setting 36 may specify that a first actuator input 16 is to be sent to a first selected window 26 of a first application program, MYAPP1, and that a second actuator input 20 is to be sent to a second selected window 30 of a second application program MYAPP2. Thus, a user may specify, for example, that a first actuator input be sent to a drawing application program, while a second actuator input be sent to a word processing program. In addition, the user specified setting may include a user mapping of a GUI element within a window, such as frame F within first window W1, to the first actuator input or second actuator input. In this manner, the user may customize the predetermined selection rules 28 to meet individual needs, by mapping inputs to windows and/or frames generated by specified application programs. As discussed above, the user specified settings may be used in combination with spatial and/or temporal selection rules. Combining various types of predetermined selection rules may be particularly useful when a large number of windows are displayed in the GUI 46.

In some embodiments, as shown in FIG. 6 and FIG. 7, the first user input device actuator 18 and the second user input device actuator 22 are each mounted in a user input device 70 having a common housing 72, that is, a housing that is shared by both the first and second user input device actuators. Further, the common housing 72 may be in the shape of a mouse. The mouse may have a right click button 74 and a left click button 76, and the first and second actuators may be positioned proximate to, and in some embodiments intermediate, the right click button 74 and left click button 76. In other embodiments, the housing of the user input device 70 may be in the shape of a track ball, a keyboard, a numerical keyboard, and various other user input devices.

Again referring to FIG. 6 and FIG. 7, the first user input device actuator 18 and second user input device actuator 22 may be provided in the form of scroll wheels configured for independent rotation. The first user input device actuator 18 and the second user input device actuator 22 may be mounted in and partially enclosed by the housing 72 of the user input device 70, may extend to be substantially perpendicular to a housing surface 78. While rotationally independent, the actuators may be mounted along a common rotational axis. Additionally, the first user input device actuator 18 and the second user input device actuator 22 may be positioned proximate to each other and in a substantially parallel orientation. The first user input device actuator 18 and the second user input device actuator 22 may extend longitudinally down the user input device 70, allowing for ease of manipulation of the actuators. Alternatively, the first user input device actuator 18 and the second user input device actuator 22 may be spaced apart from each other, and/or may not share a common rotational axis.

Furthermore, as shown in FIG. 8, the first user input device actuator 18 and the second user input device actuator 22 may be separated by a divider 79, extending out of the housing of the user input device. The divider 79 may have a profile that is substantially larger than the profile of the first user input device actuator 18 or the second user input device actuator 22. The divider may serve to separate the first user input device actuator 18 and the second user input device actuator 22, providing a user haptic feedback to position digits on the actuators, and allowing operation of each actuator to be carried out independently.

In some embodiments the first user input device actuator 18 and the second user input device actuator 22 may be constructed to be different from each other in material, shape, size texture, and/or color, to enable the user to easily distinguish the actuators. Further, each of the actuators may be equipped to provide a distinguishable haptic response to the user. For example, each of the actuators may be equipped with clicking detents that provide haptic feedback during rotation, and the first user input device actuator 18 may be equipped with stronger and/or differently spaced detents than the second user input device actuator 22, or vice versa, to thereby vary the rotational resistance, haptic feedback pattern, and/or sound produced during use of each actuator. In this way, a distinction can be made between the first user input device actuator 18 and the second user input device actuator 22, allowing the user to easily differentiate between the actuators.

Still in other embodiments, the first user input device actuator 18 and the second user input device actuator 22 may be each mounted in separate user input devices having respective housings, as schematically illustrated with dot-dash lines in FIG. 1. For example, the first user input device actuator 18 may be mounted in a mouse and the second user input device actuator 22 may be mounted in a keyboard. In another example, the first user input device actuator 18 may be mounted in a housing of a display and the second user input device actuator 22 may be mounted in a housing of a computing device. It can be appreciated that the user input device actuators may be mounted in other suitable devices.

Figure 9:
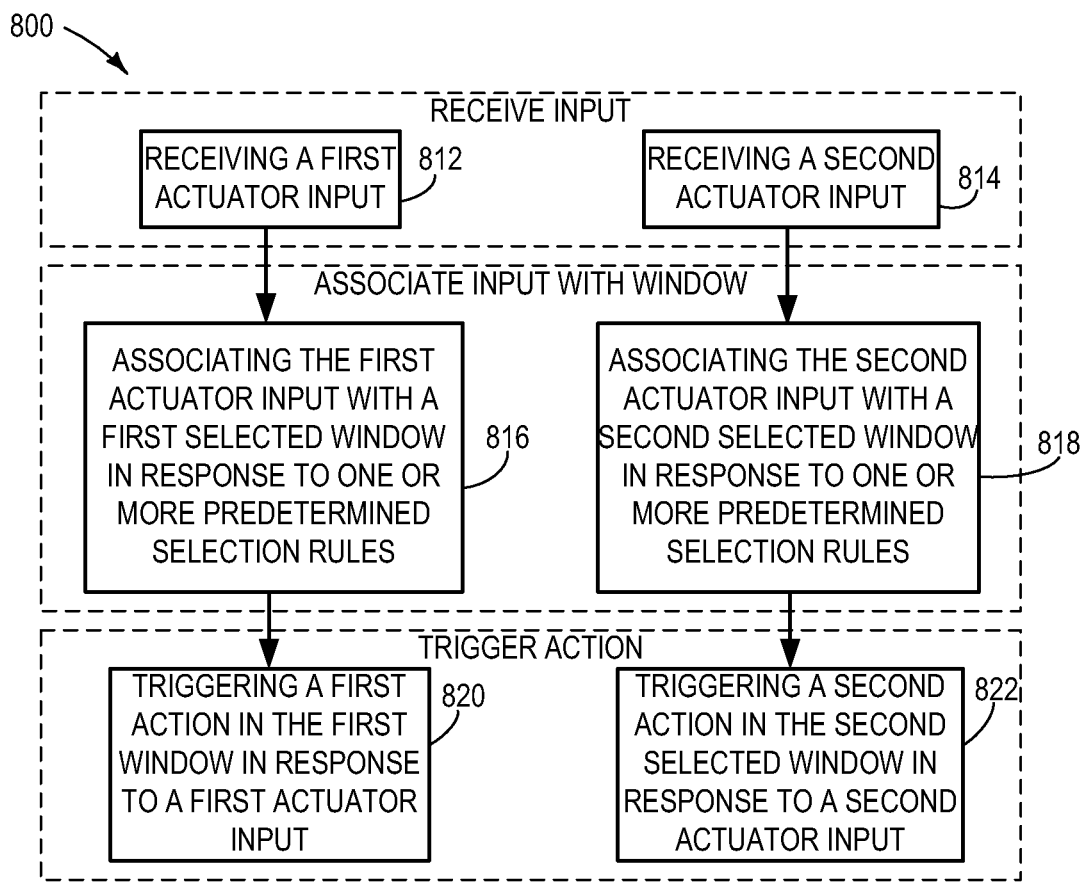
FIG. 9 illustrates a flowchart of one embodiment of a method for managing inputs from a plurality of user input device actuators.

FIG. 9 shows a method 800 for operation of a computing device. The method 800 may be implemented using the hardware and software components of the systems and devices described above, but alternatively may be implemented using other suitable hardware and software components. In some exemplary embodiments the first user input device actuator and second user input device actuator, disclosed in method 800, are substantially parallel scroll wheels partially enclosed by a housing in the shape of a mouse, the housing including a right and a left button proximate to the scroll wheels. In other embodiments, the first user input device actuator and second user input device actuator may be mounted in a different configurations and/or in alternate user input devices, as described above.

As illustrated at 812, the method includes receiving a first actuator input from a first user input device actuator. At 814, the method includes receiving a second actuator input from a second user input device actuator.

At 816, the method further includes associating the first actuator input with a first selected window in response to one or more predetermined selection rules. As previously mentioned, the predetermined selection rules may be based on factors selected from the group consisting of spatial position of the first and second selected windows, temporal properties of the first and second selected windows, and user specified settings.

At 818, the method includes associating the second actuator input with a second selected window in response to the predetermined selection rules. According to these selection rules, the first actuator input and the second actuator input may be assigned to various windows, without a user manually adjusting the focus of the windows.

As shown at 820, the method includes triggering a first action in the first selected window in response to a first actuator input. At 822, the method further includes triggering a second action in the second selected window in response to a second actuator input. By way of example, each of the first and second actions may be one or more of tabbing, list item selection, scrolling, mode changing, window switching, gadget switching, zooming, window sizing, menu list access, multiple desktop switching, magnification, panning, rate change, sensitivity adjustment, and user re-assignable actions. Triggering the first action in the first window may include sending the first actuator input to the first selected window. Likewise, triggering the second action in the second window may include sending the second actuator input to the second selected window. It will be appreciated that the method may loop to continue the mapping of actuator inputs to selected windows, as desired.

As depicted in FIG. 9, it will be appreciated that receiving the first actuator input at 812 and receiving the second actuator input at 814 may occur concurrently, as may the downstream associating of each of these inputs with the first and second selected windows at 816, 818, and the triggering of corresponding actions in each of the selected windows at 820, 822. With such concurrent processing, a user may use the first user input device actuator and the second user input device actuator concurrently to send input to the different selected windows.

The above described systems and methods may be implemented to enable a user to efficiently map inputs from a plurality of user input device actuators to respective windows in a multiple window operating environment, potentially enhancing the user experience. While two actuator inputs and two selected windows are illustrated by way of example, it will be appreciated that multiple user input actuators may be mapped to multiple windows, as desired. Thus, for example, three, four, or more user input device actuators may be provided, and the systems and methods described above may be configured to process in parallel actuator input from the three, four, or more user input device actuators. Further, while certain modules are shown as implemented in an application programming interface, it will be appreciated that the functions carried out by these modules may be implemented by any number of modules and/or may be implemented via an application program, driver, or as other code executable on the computing device.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing device for managing inputs from a plurality of user input device actuators, the computing device comprising code stored in memory for implementing via a processor:
   an actuator input module configured to receive a first actuator input from a first scroll wheel in a mouse, and a second actuator input from a second scroll wheel in the mouse; and
   a window selection module configured to select a first selected window to which the first actuator input is sent according to predetermined selection rules and concurrently select a second selected window to which the second actuator input is sent according to the predetermined selection rules, send the first actuator input to the first selected window and to send the second actuator input to the second selected window, and encode the first actuator input to instruct the first selected window to perform a first action in response to receiving the first actuator input and encode the second actuator input to instruct the second selected window to perform a second action in response to receiving the second actuator input.

2. The computing device of claim 1, wherein the first and second actions are selected from the group consisting of tabbing, list item selection, scrolling, mode changing, window switching, gadget switching, zooming, window sizing, menu list access, multiple desktop switching, magnification, panning, rate change, sensitivity adjustment, and user re-assignable actions.

3. The computing device of claim 1, wherein at least one of the predetermined selection rules is based on a detected spatial position of the first selected window and/or the second selected window.

4. The computing device of claim 3, wherein the detected spatial position includes a detected variation in horizontal position or vertical position of the first selected window and the second selected window.

5. The computing device of claim 1, wherein at least one of the predetermined selection rules is based on a detected temporal property of the first selected window and/or the second selected window.

6. The computing device of claim 5, wherein the temporal property is a chronological order of the first selected window and/or a chronological order of the second selected window.

7. The computing device of claim 1, wherein at least one of the predetermined selection rules is based on a user specified setting.

8. The computing device of claim 7, wherein the user specified setting includes a user mapping of a GUI element within a window to the first actuator input or second actuator input.

9. The computing device of claim 1, wherein the first scroll wheel and the second scroll wheel are mounted in a housing of the mouse.

10. The computing device of claim 9, wherein the first scroll wheel and the second scroll wheel are separated by a divider.

11. The computing device of claim 9, wherein the first and second scroll wheels are constructed to be different in material, shape, size, texture, and/or color.

12. The computing device of claim 9, wherein the first and second scroll wheels have distinguishable haptic responses.

13. A method for operation of a computing device, comprising:
   receiving a first actuator input from a first scroll wheel in a mouse;
   receiving a second actuator input from a second scroll wheel in the mouse;
   associating the first actuator input with a first selected window in response to one or more predetermined selection rules;
   associating the second actuator input with a second selected window in response to the predetermined selection rules without receiving user input to manually adjust focus from the first selected window to the second selected window;
   triggering a first action in the first selected window in response to the first actuator input; and
   triggering a second action in the second selected window in response to the second actuator input.

14. The method of claim 13, wherein the predetermined selection rules are based on factors selected from the group consisting of spatial position of the first and second selected windows, temporal properties of the first and second selected windows, and user specified settings.

15. The method of claim 13, wherein each of the first and second actions is selected from the group consisting of tabbing, list item selection, scrolling, mode changing, window switching, gadget switching, zooming, window sizing, menu list access, multiple desktop switching, magnification, panning, rate change, sensitivity adjustment, and user re-assignable actions.

16. The method of claim 13,
   wherein triggering the first action in the first selected window includes sending the first actuator input to the first selected window; and
   wherein triggering the second action in the second selected window includes sending the second actuator input to the second selected window.

17. The method of claim 13 wherein the first scroll wheel and the second scroll wheel are substantially parallel and partially enclosed by a housing of the mouse, the housing including a right and a left button proximate to the scroll wheels.

18. The method of claim 13, wherein the first actuator input and the second actuator input are received concurrently.

* * * * *